(12) United States Patent
Harper

(10) Patent No.: US 8,894,349 B2
(45) Date of Patent: Nov. 25, 2014

(54) TURBOMACHINE CASING ASSEMBLY

(75) Inventor: Cedric B Harper, Derby (GB)

(73) Assignee: Rolls-Royce PLC, London (GB)

( * ) Notice: Subject to any disclaimer, the term of this patent is extended or adjusted under 35 U.S.C. 154(b) by 641 days.

(21) Appl. No.: 12/855,170

(22) Filed: Aug. 12, 2010

(65) Prior Publication Data
US 2011/0044806 A1   Feb. 24, 2011

(30) Foreign Application Priority Data

Aug. 20, 2009 (GB) .................................. 0914523.6
Feb. 12, 2010 (GB) .................................. 1002344.8

(51) Int. Cl.
F01D 25/24 (2006.01)
F01D 21/04 (2006.01)
F02C 7/05 (2006.01)

(52) U.S. Cl.
CPC ............. F01D 21/045 (2013.01); F01D 25/24 (2013.01); F02C 7/05 (2013.01); Y02T 50/672 (2013.01); F05D 2240/14 (2013.01)
USPC .......................................... 415/9; 415/214.1

(58) Field of Classification Search
CPC ....... F01D 25/243; F01D 25/24; F01D 25/26; F01D 21/045; F02C 7/05
USPC ....................... 415/214.1, 182.1, 173.3, 174.2
See application file for complete search history.

(56) References Cited

U.S. PATENT DOCUMENTS

| | | | |
|---|---|---|---|
| 4,329,113 A | | 5/1982 | Ayache et al. |
| 5,344,284 A | * | 9/1994 | Delvaux et al. ............ 415/173.2 |
| 5,603,510 A | * | 2/1997 | Sanders ........................ 277/413 |
| 6,547,522 B2 | * | 4/2003 | Turnquist et al. .......... 415/173.3 |
| 2004/0037694 A1 | * | 2/2004 | Mather ............................. 415/9 |
| 2004/0115043 A1 | | 6/2004 | Lee et al. |
| 2005/0089391 A1 | | 4/2005 | Stretton |
| 2006/0210391 A1 | * | 9/2006 | McMillan .................. 415/121.2 |

FOREIGN PATENT DOCUMENTS

| | | |
|---|---|---|
| EP | 1 467 066 A2 | 10/2004 |
| EP | 1 643 172 A1 | 4/2006 |
| GB | 2 129 880 A | 5/1984 |
| GB | 2 223 811 A | 4/1990 |
| GB | 2 343 224 A | 5/2000 |
| GB | 2 407 344 A | 4/2005 |
| GB | 2 429 043 A | 2/2007 |

OTHER PUBLICATIONS

Great Britain Search Report dated Nov. 25, 2009 in Great Britain Patent Application No. 0914523.6.
Great Britain Search Report dated May 27, 2010 in Great Britain Patent Application No. 1002344.8.
Sep. 3, 2012 Search Report issued in European Patent Application No. 10 17 2600.

* cited by examiner

*Primary Examiner* — Ned Landrum
*Assistant Examiner* — Kayla McCaffrey
(74) *Attorney, Agent, or Firm* — Oliff PLC

(57) ABSTRACT

A turbomachine casing assembly comprises a first casing portion for at least partially encasing one or more rotating aerofoil structures of a turbomachine and a second casing portion; the first casing portion being movable with respect to the second casing portion. One or more resilient elements are arranged so as to resist movement of the first casing portion with respect to the second casing portion.

15 Claims, 5 Drawing Sheets

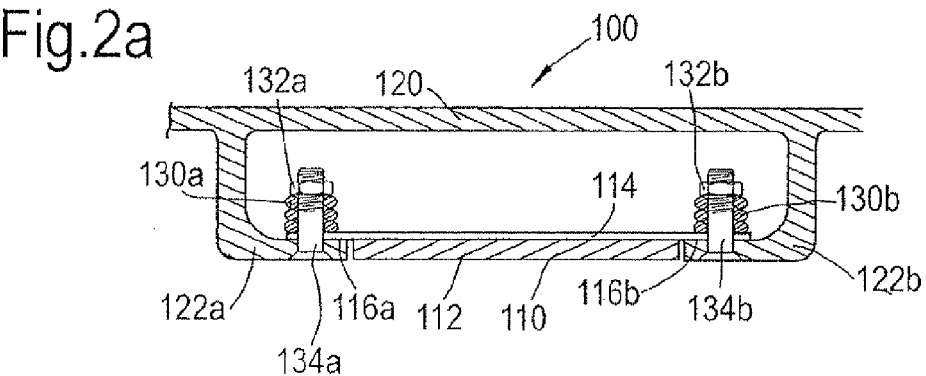
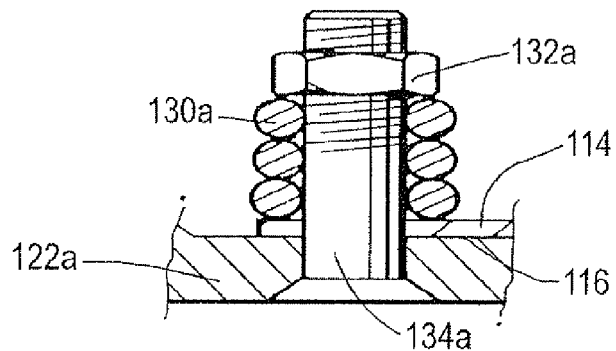
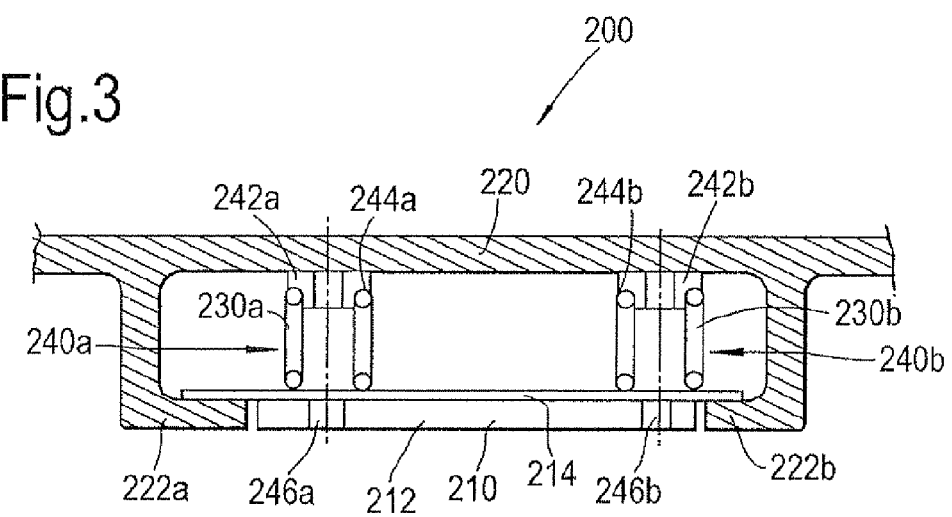

TURBOMACHINE CASING ASSEMBLY

This invention relates to a turbomachine casing assembly and particularly, but not exclusively, relates to a casing assembly for the fan of a gas turbine engine.

Figure 1:
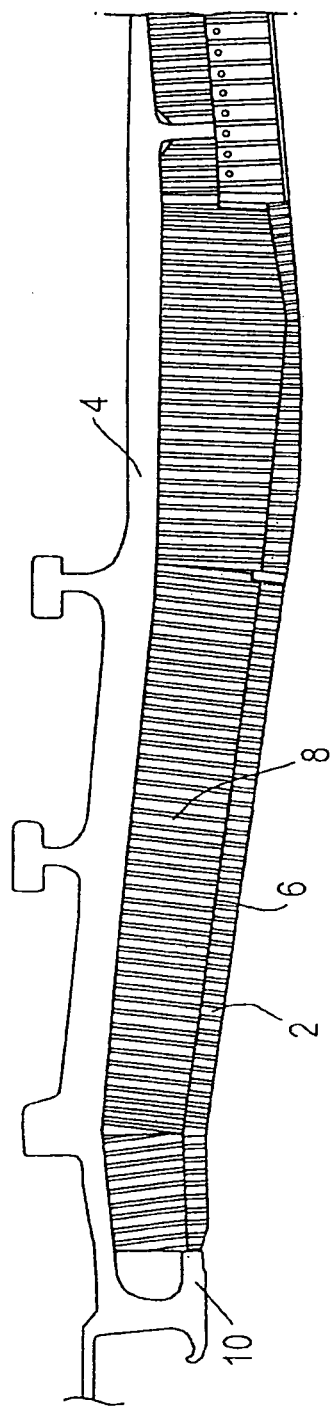

FIG. 1 shows a conventional fan track liner 2 which is bonded directly to the fan case 4 of a typical jet engine. When a fan blade (not shown) is released, for example due to a bird strike, the fan blade travels radially outwards penetrating the attrition liner 2, septum 6 and aluminium honeycomb 8 until it reaches the metallic casing 4. The fan blade then travels forwards where it is captured by a hook 10 to prevent further axial forward movement thereby containing the fan blade. Furthermore, by providing an adequate thickness of the aluminium honeycomb 8, the remaining fan blades, which are still attached to the rotor assembly, are prevented from machining away the casing 4 during subsequent run on of the jet engine. The aluminium honeycomb 8 therefore acts as a void filler/spacer which positions the attrition liners 2 in the correct radial and axial position, whilst accommodating the orbiting rotor assembly. The aluminium honeycomb 8 also needs to be rigid enough to support the attrition liner 2 to prevent damage during ice impacts when ice is shed from the rotor assembly. The honeycomb 8 may comprise a filler material (not shown), partially or entirely filling the cells of the honeycomb.

In addition to the fan blade-off scenario described above, fan blade to attrition liner interactions (rubs) may occur for the following further reasons:—

Casing distortion as a result of gyroscopic effects during excessive aircraft manoeuvres;
Casing distortion as a result of a heavy landing;
Fan blade 'dig in' due to blade untwist during bird or Foreign Object Damage (FOD) impacts; and
Sudden fan blade speed increase.

Following a heavy tip rub, the fan track will suffer severe damage in the form of either trenches machined into the liner, or worse the liner may be ripped out which could be hazardous to the aircraft. Aerodynamic performance is also affected to such an extent that the liner either requires repair or replacement at the earliest opportunity. This is both time consuming and costly to the airline. Another problem is that heavy tip rubs cause fan blade tip bluing which affects the life of the fan blade. The fan track liner could also be irreversibly damaged by ice impacting onto the surface, FOD or bird impacts.

The invention therefore seeks to address these issues.

According to the invention, there is provided a turbomachine casing assembly, a first casing portion for engaging a second casing portion to form such an assembly, and a method of installing such a casing portion, as set out in the claims.

Figure 4A:
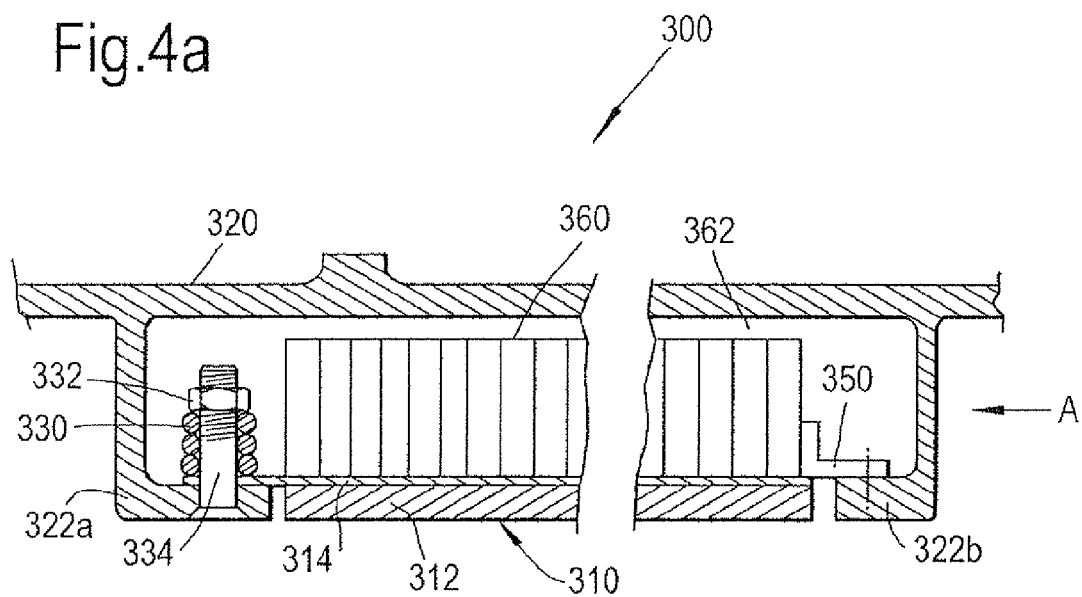
Figure 4B:
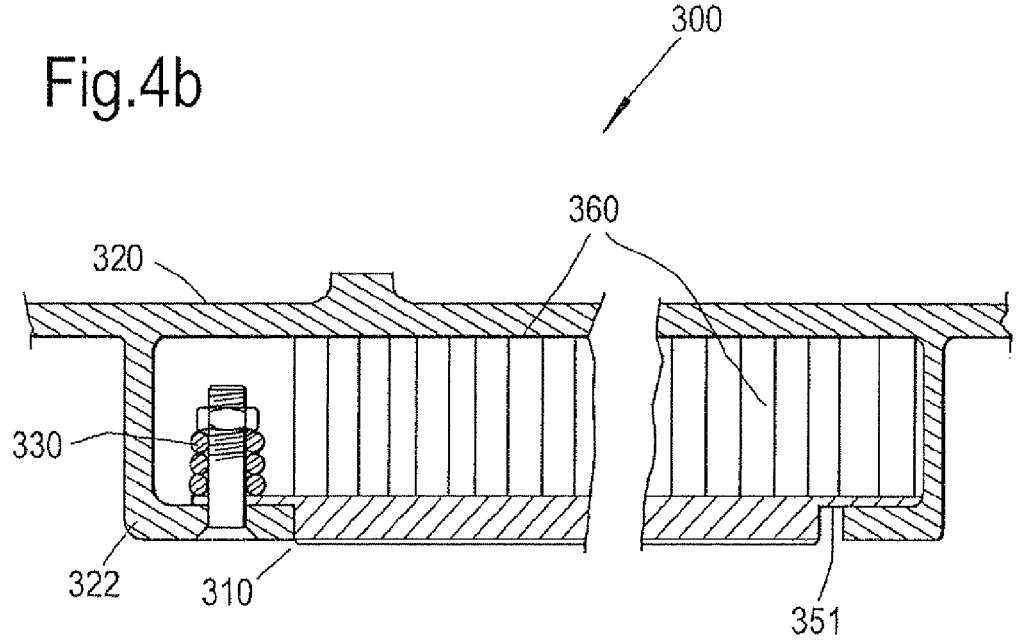
Figure 5:
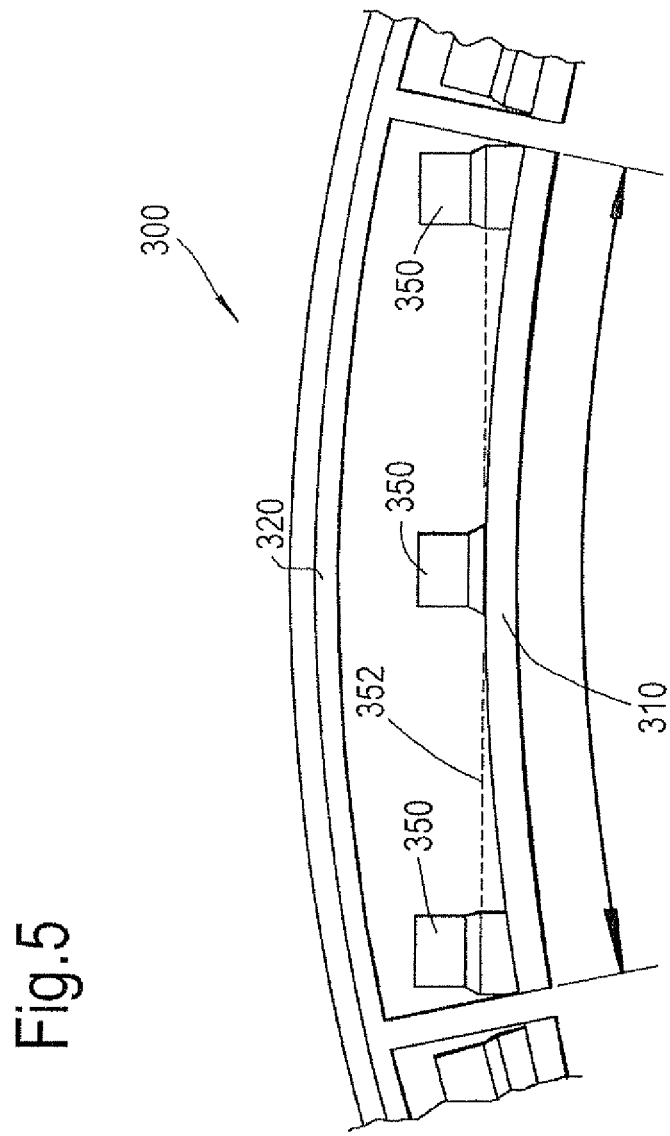
Figure 6:
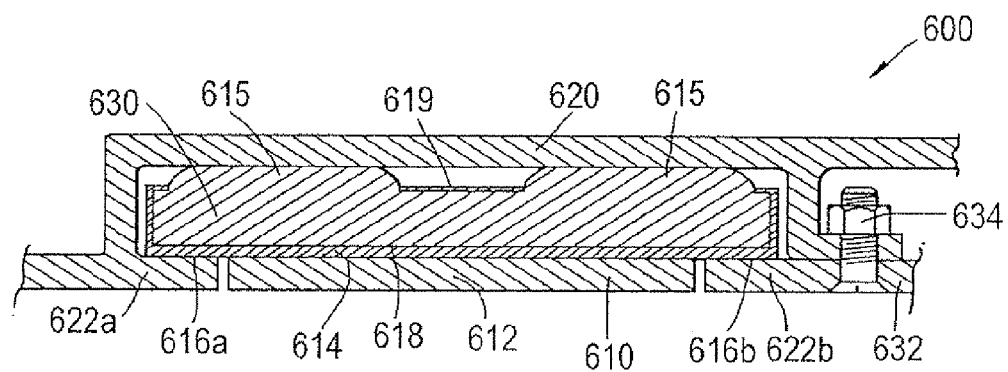
Figure 7:
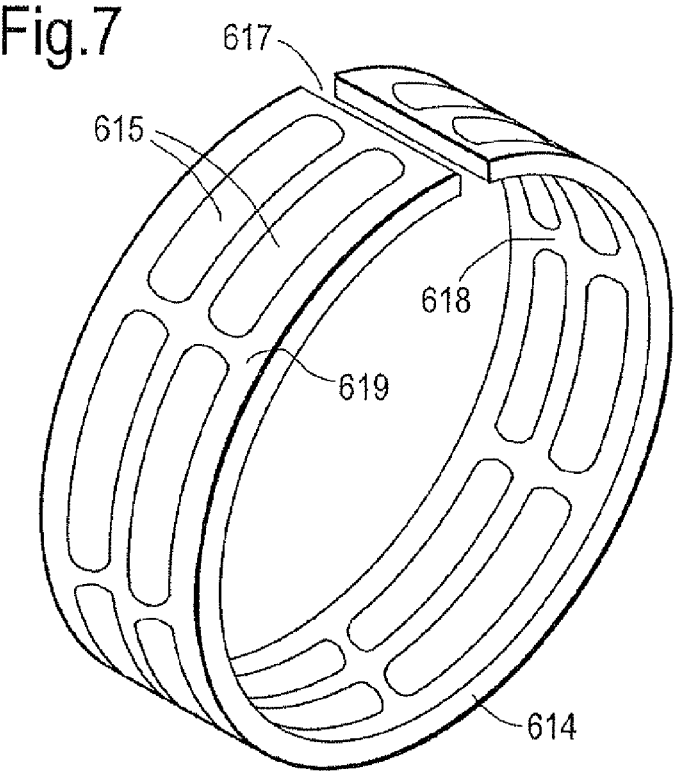

For a better understanding of the invention, and to show more clearly how it may be carried into effect, reference will now be made, by way of example, to the accompanying drawings, in which:

FIG. 1 shows a prior art arrangement of a fan casing;
FIG. 2 shows a sectional side view of a turbomachine casing assembly according to a first embodiment of the invention (FIG. 2a) and an enlarged view of the resilient member (FIG. 2b);
FIG. 3 shows a sectional side view of a turbomachine casing assembly according to a second embodiment of the invention;
FIG. 4 shows a sectional side view of a turbomachine casing assembly according to a third embodiment of the invention. FIGS. 4a and 4b show first and second examples of the third embodiment;
FIG. 5 shows an end on view of the third embodiment corresponding to arrow A shown in FIG. 4a;
FIG. 6 shows a sectional side view of a turbomachine casing assembly according to a fourth embodiment of the invention; and
FIG. 7 shows a perspective view of a housing for an inflatable member as shown in FIG. 6.

With reference to FIGS. 2a and 2b, a turbomachine casing assembly 100, according to a first embodiment of the invention, comprises a first casing portion 110 and a second casing portion 120. The first casing portion 110 at least partially encases and surrounds one or more rotating aerofoil structures (not shown). These aerofoil structures may comprise blades of a turbomachine, in particular compressor fan blades. The second casing portion 120 is disposed radially outward of the first casing portion 110. The turbomachine casing assembly 100 comprises a plurality of first casing portions 110 circumferentially disposed about a curve defined by the blade tip path of the one or more aerofoil structures of the turbomachine.

The first casing portion 110 is movable with respect to the second casing portion 120 in a substantially radial direction. The turbomachine casing assembly 100 is further provided with one or more resilient elements in the form of springs 130a, 130b, which are arranged so as to resist movement of the first casing portion 110 with respect to the second casing portion 120. In particular, the first casing portion 110 is connected to the second casing portion 120 by virtue of a first spring 130a at a forward end of the first casing portion. The first casing portion is connected to the second casing portion by virtue of a second spring 130b at a rearward end of the first casing portion. Further springs may be provided at any point on the first casing portion.

Each first casing portion 110 comprises a curved panel in the form of an attrition liner 112 which is attached to a composite or metallic backing tray 114. The fan blades rub against the attrition liner 112 and form a seal during normal engine operation. Each liner 112 and backing tray 114 forms an arc of a sector such that the fan casing assembly comprises multiple sectors. The backing tray 114 is axially longer than the attrition liner 112 and as such the backing tray 114 forms abutment shoulders 116a, 116b at the forward and rearward ends of the first casing portion 110. The second casing portion 120 comprises hooked portions 122a, 122b which extend radially inwardly. The abutment shoulders 116a, 116b interlock with the hooked portions 122a, 122b such that the backing tray 114 is disposed radially between the hooked portions 122a, 122b and the remainder of the second casing portion 120.

FIG. 2b shows an enlarged view of the spring arrangement. The springs 130a, 130b are attached at one end to the radially outermost surface of each backing tray 114. A locking nut 132a, 132b is attached to the other end of each spring. The attachment of the locking nut to the spring is necessary to resist rotation of the nut during assembly. During fan case assembly, each first casing portion 110 is manoeuvred into position and screw fasteners 134a, 134b are inserted radially to pass through openings in the hooked portions 122a, 122b of the second casing portion 120. The screw fasteners pass into the nuts 132a, 132b contained at the end of each spring. Each screw fastener is torque tightened to a specific value to achieve the required compression in the spring. Washers, for example Belleville washers, may be disposed between the springs and the locking nuts.

The springs 130a, 130b may be encapsulated within guide sheaths, both to control radial alignment and to protect the spring from environmental effects, such as corrosion. The springs may be replaced by an elastomeric bellows arrangement which allows radial movement of the attrition liner whilst providing a radial force to bias the attrition liner into its normal operating position. There may be a mixture of springs and radial bellows to achieve the desired effect. Further still, Belleville washers may be used in place of the springs.

When the fan blade contacts the attrition liner, the attrition liner will deflect radially and then return back to its previous installed position once the rub event has finished. During such an event, damage to the attrition liner will be minimised and this is desirable as it reduces costly maintenance and engine down time. Furthermore, as there is no outer honeycomb as with conventional casing assemblies, the underlying structure will not sustain damage during fan blade/liner interaction and repairs will not be required. The amount of liner deflection could be controlled by variation of the torque when assembling the screw fasteners 134a, 134b.

The honeycomb structure in conventional casings absorbs energy from the fan blade in a fan blade off event, and therefore the mechanical properties of the honeycomb significantly influence the containment behaviour of the casing assembly. If the containment behaviour in a particular engine configuration is unsatisfactory, it is difficult, expensive and time-consuming to re-design the honeycomb structure (typically involving, inter alfa, changing the honeycomb cell thickness and the hardness of the filler). With the casing assembly of the invention, the containment behaviour can be altered simply by tuning the springs (or equivalent resilient elements) to change the amount of deflection in the system. Because the springs absorb energy during fan blade off, and thereby contribute towards containment, it may be possible to reduce the fan case thickness, yielding a cost and weight reduction.

The resilience of the casing assembly of the invention also permits some energy to be absorbed from ice impacts during normal engine operation, by allowing elements of the casing assembly to deflect. With conventional casing assemblies, the attrition liners are often damaged by such impacts because no deflection is possible.

The resilience of the casing assembly of the invention permits some energy to be absorbed during fan blade interactions or rubs. When using a metallic fan blade, this will help to prevent excessive fan blade tip bluing. Alternatively, when using a composite fan blade, this will reduce fan blade tip wear and thus ensure tip clearances are minimised for optimum aerodynamic performance.

In addition to the above, the casing assembly of the invention is structurally simplified over that of the prior art, thereby reducing cost and weight. Furthermore, in the particular case of a composite fan blade, a fan blade/liner interaction would not damage the fan blade. Similarly, for a metallic fan blade tip bluing would be eliminated.

With reference to FIG. 3, a turbomachine casing assembly 200 according to a second embodiment of the invention comprises a release mechanism 240a, 240b, which releases resilient elements in the form of springs 230a, 230b, once the first casing portion 210 is in the installed position relative to the second casing portion 220. The second embodiment is otherwise similar to the first embodiment, for example the first casing portion 210 comprises a backing tray 214 and an attrition liner 212, with the backing tray overhanging the attrition liner in order to abut hooked portions 222a, 222b of the second casing portion 220.

The release mechanism 240a, 240b comprises a nut 242a, 242b with a threaded opening for receiving a screw. The nut 242a, 242b comprises an abutment shoulder 244a, 244b which extends about the perimeter of the nut and is arranged so as to receive an end of spring 230a, 230b. Each spring 230a, 230b is attached to the backing tray 214 radially outermost surface at a first end and the nut 242a, 242b at a second end and this prevents rotation of the spring and nut during assembly.

To assemble the first casing portion 210 into position, screws (not shown) are initially inserted through holes 246a, 246b in the attrition liner 212 and backing tray 214. The screw passes through the centre of each spring 230a, 230b and into the nut 242a, 242b. By tightening the screw prior to installation, the spring is compressed and is put into a pre-stressed state. Once fully compressed, each liner 212 can be assembled into position between the hooked portions 222a, 222b. The screws are then loosened and removed so that the spring is released. The spring then forces the nut 242a, 242b against the second casing portion 220 and the backing tray 214 against the hooked portions 222a, 222b, thereby radially retaining the first casing portion. The axial position of the first casing portion is also limited by the abutment of the attrition liner 212 with the hooked portions 222a, 222b. This installation procedure is advantageous as it compresses the resilient elements prior to installation and enables the first casing portion to be located more easily with respect to the second casing portion. Furthermore, this installation procedure is advantageous because existing casing assemblies could be retro-fitted with first casing portions comprising resilient elements. The second embodiment is additionally advantageous because the screw fasteners are eliminated once installed, thereby reducing cost and weight. Furthermore, the amount of liner deflection could be controlled by selecting different spring tensions.

As for the first embodiment, the springs 230a, 230b may be encapsulated within guide sheaths to control radial alignment and to protect the spring from environmental effects, such as corrosion. The springs 230a, 230b may be replaced by an elastomeric bellows arrangement which allows radial movement of the attrition liner whilst providing a radial biasing force to retain the attrition liner in its normal operating position. There may be a mixture of springs, radial bellows and/or Belleville washers to achieve the desired effect.

With reference to FIGS. 4a and 4b, a turbomachine casing assembly 300 according to a third embodiment of the invention comprises a first casing portion 310 and a second casing portion 320. As for the first and second embodiments, the first casing portion 310 is connected to the second casing portion 320 by virtue of a resilient element, in the form of a spring 330, at a first end of the first casing portion. However, in contrast to the first and second embodiments, the first casing portion 310 of the third embodiment is rotatably coupled with respect to the second casing portion 320 at a second end of the first casing portion. The first casing portion 310 is rotatably coupled with respect to the second casing portion 320 by virtue of a hinge 350, as shown in FIG. 4a. Alternatively, the first casing portion may be rotatably coupled with respect to the second casing portion by virtue of a flexible portion 351 between the first and second casing portions, as shown in FIG. 4b.

The third embodiment is otherwise substantially the same as the first embodiment. For example, the first casing portion 310 comprises a backing tray 314 and an attrition liner 312. However, in contrast to the first embodiment, the backing tray 312 only overhangs the attrition liner and abuts the hooked portion 322a at a first (forward) end of the first casing portion 310 because the hinge 350 is provided at a second (rearward) end of the first casing portion. A first portion of the hinge 350 is connected to hooked portion 322b of the second casing portion 320 and a second portion of hinge 350 is connected to the second end of the first casing portion 310, the first and second portions of the hinge 350 being rotatably coupled to one another.

The spring arrangement at the first end of the first casing portion 310 for the third embodiment is substantially the same as the spring arrangement for the first embodiment. For example, a screw fastener 334 passes radially through an opening in the hooked portions 322a and the backing tray 314 with a spring 330 arranged between the backing tray and a locking nut 332 provided at an end of the screw.

FIG. 5 shows an end on view corresponding to direction A shown in FIG. 4a. The axis of rotation, i.e. the hinge line 352, may be tangential to the curve of the first casing portion 310 at a mid-point along the sector arc defined by the first casing portion. In order to permit rotation of the curved first casing portion with respect to the second casing portion, the hinge line is radially offset from the first casing portion at either end of the arc defining the first casing. Alternatively, the first casing portion may be coupled to the second casing portion with a flexible membrane so that the axis of rotation does not have to be straight.

Advantageously the third embodiment allows a fan blade to penetrate the first casing portion at a forward point (in the case of a blade off event), whilst remaining rigid to ice impact at the rear as this is closer to the hinge 350.

The first, second and third embodiments may be provided with an infill member, for example a structural and/or acoustic liner, between the first and second casing portions. Such an acoustic and/or structural liner 360 is shown for the third embodiment in FIGS. 4a and 4b, but may also be included with the first and second embodiments. The liner 360 may be a frangible or crushable structure, such as an acoustic foam or honeycomb. Furthermore, there may be a gap 362 between the liner 360 and the second casing portion 320 (as shown in FIG. 4a), or the liner 360 may abut both the first and second casing portions 310, 320 (as shown in FIG. 4b).

With all of the embodiments described above, the spring force can be varied to allow for different displacements during either fan blade to liner interactions or FOD/ice/bird impacts with the attrition liner.

With reference to FIG. 6, a turbomachine casing assembly 600 according to a fourth embodiment of the invention comprises a first casing portion 610 and a second casing portion 620. The first casing portion 610 at least partially encases and surrounds one or more rotating aerofoil structures (not shown). These aerofoil structures may comprise blades of a turbomachine, in particular compressor fan blades. The second casing portion 620 is disposed radially outward of the first casing portion 610. The turbomachine casing assembly 600 comprises a plurality of first casing portions 610 circumferentially disposed about a curve defined by the blade tip path of the one or more aerofoil structures of the turbomachine. Alternatively, the turbomachine casing assembly 600 may comprise a single first casing portion 610.

The first casing portion 610 is movable with respect to the second casing portion 620. In particular, the first casing portion 610 is movable with respect to the second casing portion 620 in a substantially radial direction. The turbomachine casing assembly 600 is further provided with a resilient element in the form of an inflatable member 630 arranged so as to resist movement of the first casing portion 610 with respect to the second casing portion 620. The inflatable member 630 may be in the form of a bellows or, as in the particular example shown, in the form of a bladder.

The inflatable member 630 may be inflated with one or more of gas, liquid and a solid. For example, the inflatable member 630 may be inflated with air or with an elastomer. The inflatable member may be filled with any substance which when contained within the inflatable member forms a resilient element. The inflatable member 630 could also be filled with a coloured medium to provide an indication in the event of a leak or loss of pressure.

The inflatable member may be filled with a substance which is initially under pressure.

The pressure within the bladder may also be selected to suit the operating conditions of the turbomachine casing assembly 600. For example, in the case of the turbomachine casing assembly 600 being used for a jet engine, the pressure in the inflatable member 630 may be selected to be greater than the pressure around the fan casing at a cruise altitude. Thus, the inflatable member may initially be under a vacuum on the ground, but at cruise altitude the inflatable member may expand due to the lower atmospheric pressure.

The turbomachine casing assembly 600 may further comprise a housing 614, which may be in the form of a cage or framework, arranged to house the inflatable member 630. The housing 614 is disposed between the first casing portion 610 and the second casing portion 620. The housing 614 may comprise one or more openings 615. The openings 615 may be disposed such that when the inflatable member 630 is in an inflated configuration (as shown in FIG. 6), the inflatable member 630 may extend through the one or more openings 615 and the inflatable member may contact one or more of the first and second casing portions 610, 620. In the example shown the inflatable member 630 extends through the openings 615 and contacts the second casing portion 620.

Each first casing portion 610 comprises a curved panel in the form of an attrition liner 612, which may be attached to the housing 614. The fan blades rub against the attrition liner 612 and form a seal during normal engine operation. Each liner 612 forms an arc of a sector such that the fan casing assembly comprises multiple sectors.

The housing 614 is axially longer than the attrition liner 612 and as such the housing 614 forms abutment shoulders 616a, 616b at the forward and rearward ends of the first casing portion 610.

The turbomachine casing assembly 600 further comprises first and second hooked portions 622a, 622b which extend radially inwardly and circumferentially towards each other. As shown in FIG. 6, the first hooked portion 622a may be integral to the second casing portion 120. By contrast, the second hooked portion 622b may be formed, at least in part, by a retainer 632 connected to the second casing portion 620. The retainer 632 may be connected to the second casing portion 620 by a nut and bolt assembly 634. The abutment shoulders 616a, 616b interlock with the hooked portions 622a, 622b such that the housing 614 is disposed radially between the hooked portions 622a, 622b and the remainder of the second casing portion 620. The abutment shoulders 616a, 616b are arranged to limit movement of the first casing portion 610 in a direction towards the aerofoil structures.

With reference to FIG. 7, the housing 614 may be substantially tubular. The housing 614 may comprise one or more gaps 617 in the circumference of the substantially tubular housing. The one or more gaps 617 allow the housing 614 to expand or contract. In the particular example shown, the housing 614 comprises a single gap 617 and thus resembles a circlip. However, there may be a plurality of gaps such that the turbomachine casing assembly 600 comprises a plurality of housings 614. Each housing 614 may correspond to the segments of the abradable liner 612. Alternatively, the housing may comprise no gaps in the circumference such that housing is completely circular.

The housing 614 may comprise substantially concentric inner and outer walls 618, 619. The inflatable member 630 is disposed between the inner and outer walls 618, 619. The one or more openings 615 may be arranged on one or both of the inner and outer walls 618, 619 of the housing 614. The one or more openings 615 may be elongate and may be orientated in a circumferential direction about the housing 614.

The inflatable member 630 at least partially extrudes through each of the openings 615 by virtue of the pressure within the inflatable member 630. The inflatable member 630 may then contact the first and/or second casing portions 610, 620. The number of openings 615 may vary according to the amount of support required between the first and second casing portions 610, 620.

The housing 614 may be manufactured from a metal or from a composite material. The housing 614 may be extruded into a circular section. The housing 614 may be laser cut or it may be compression moulded. The housing 614 may be manufactured in segments, or in a single circular or near-circular piece. The abradable liner 612 may also be manufactured as continuous or segmented.

During assembly, the inflatable member 630 is not inflated. This allows each liner segment 612 to be manoeuvred into the correct position and the retainer 632 to be attached to the second casing portion 620 via the radial screws 634. Once in position, the inflatable member 630 is inflated to achieve the desired pressure. Under pressure, the inflatable member 630 extrudes through each of the openings 615 in the housing outer surface 619, thereby providing a radial force against the bore of the second casing portion 620.

When the fan blade contacts the attrition liner, the attrition liner will deflect radially and then return back to its previous installed position once the rub event has finished. During such an event, damage to the attrition liner will be minimised and this is desirable as it reduces costly maintenance and engine down time. Furthermore, as there is no outer honeycomb as with conventional casing assemblies, the underlying structure will not sustain damage during fan blade/liner interaction and repairs will not be required. The amount of liner deflection could be controlled by variation of the pressure in the inflatable member 630. The inflatable member absorbs energy during fan blade off so may contribute towards containment such that the fan case thickness can be reduced, yielding a cost and weight reduction. Variation of the pressure in the inflatable member 630 may be used to control the behaviour of the casing assembly under impact. For example, a lower pressure in the inflatable member 630 would permit greater liner deflection, so that the released fan blade could engage with the hooked portion 622a; whereas a higher pressure in the inflatable member 630 would permit less liner deflection, so that the released fan blade would tend to "bounce off" the liner 612.

During a heavy tip rub, the abradable liner 612 is displaced radially by an amount dependant on the pressure within the inflatable member 630. This would eliminate heavy tip rubs and consequently tip bluing. The pressure within the inflatable member 630 may be tuned such that the abradable liner 612 does not deflect radially during ice impact, but that during a fan blade off, the failed blade may pass easily into the cavity between the first and second casing portions 610, 620 and engage in the first hooked portion 622a for containment. The pressure within the inflatable member 630 may be checked at regular intervals and 'topped up' if necessary via a pressure valve.

In an alternative embodiment (not shown in the drawings), two inflatable members 630 may be used, one occupying the axially upstream part of the housing 614 and one occupying the axially downstream part of the housing 614. Each inflatable member would extend around the whole circumference of the housing 614. By inflating the inflatable members to different pressures, the behaviour of a released fan blade can be further controlled. For example, by providing a higher pressure in the axially upstream inflatable member than in the axially downstream inflatable member, the downstream portion of the liner 112 will deflect more than the upstream portion, and this will tend to lean or turn the fan blade in a similar manner. This may allow the containment of a released blade to be more precisely controlled.

In addition to the above, the casing assembly of the invention is structurally simplified over that of the prior art, thereby reducing cost and weight. Furthermore, in the particular case of a composite fan blade, a fan blade/liner interaction would not damage the fan blade. Similarly, for a metallic fan blade tip bluing would be eliminated.

The invention claimed is:

1. A turbomachine casing assembly comprising:
a first casing portion configured to at least partially encase one or more rotating aerofoil structures of a turbomachine;
a second casing portion, the first casing portion being movable with respect to the second casing portion; and
one or more resilient elements arranged so as to resist movement of the first casing portion with respect to the second casing portion, wherein
the first casing portion is configured to move, from an initial position, in a substantially radial direction of the turbomachine casing assembly when contacted by the one or more rotating aerofoil structures,
the first casing portion is configured to return toward the initial position when the contact by the one or more rotating aerofoil structures ceases,
the first casing portion and the second casing portion are separated by a space, and
an end of the first casing portion moves into the space between the first casing portion and the second casing portion when the first casing portion is contacted by the one or more rotating aerofoil structures,
wherein the first casing portion is rotatably coupled with respect to the second casing portion at a second end of the first casing portion.

2. A turbomachine casing assembly as claimed in claim 1, wherein the first casing portion is connected to the second casing portion by virtue of a said one or more resilient elements at an end of the first casing portion.

3. A turbomachine casing assembly as claimed in claim 1, wherein the first casing portion is rotatably coupled with respect to the second casing portion by virtue of a hinge.

4. A turbomachine casing assembly as claimed in claim 1, wherein the first casing portion is rotatably coupled with respect to the second casing portion by virtue of a flexible portion between the first and second casing portions.

5. A turbomachine casing assembly as claimed in claim 1, wherein the resilient element is an inflatable member.

6. A turbomachine casing assembly as claimed in claim 5, the assembly further comprising:
a housing arranged to house the inflatable member, wherein the housing comprises one or more openings disposed such that, when the inflatable member is inflated, the inflatable member extends through the one or more openings and contacts at least one of the first and second casing portions.

7. A turbomachine casing assembly as claimed in claim 1, wherein the turbomachine casing assembly comprises a plurality of first casing portions disposed about a curve defined by the path of the one or more aerofoil structures of the turbomachine.

8. A turbomachine casing assembly as claimed in claim 1, wherein the turbomachine casing assembly further comprises an infill member disposed between the first and second casing portions.

9. A gas turbine engine fan casing comprising a turbomachine casing assembly as claimed in claim 1.

10. A gas turbine engine comprising a turbomachine casing assembly as claimed in claim 1.

11. A turbomachine casing assembly as claimed in claim 1, wherein the first casing portion is defined by a first end and a second end and either the first or second end moves into the space between the first casing portion and the second casing portion when the first casing portion is contacted by the one or more rotating aerofoil structures.

12. A turbomachine casing assembly as claimed in claim 11, wherein both the first and second ends of the first casing portion move into the space between the first casing portion and the second casing portion when the first casing portion is contacted by the one or more rotating aerofoil structures.

13. A first casing portion configured to engage a second casing portion to form a turbomachine casing assembly, wherein
the first casing portion is configured to be movable with respect to the second casing portion while installed in the turbomachine casing and the first casing portion is rotatably coupled with respect to the second casing portion at a second end of the first casing portion,
the first casing portion is provided with a resilient element arranged to resist the movement of the first casing portion with respect to the second casing portion while installed in the turbomachine casing assembly,
the first casing portion and the second casing portion are separated by a space, and
an end of the first casing portion moves into the space between the first casing portion and the second casing portion when the first casing portion is contacted by one or more rotating aerofoil structures.

14. A first casing portion configured to engage a second casing portion to form a turbomachine casing assembly, wherein
the first casing portion is configured so that it is movable with respect to the second casing portion once installed into the turbomachine casing assembly, wherein
the first casing portion is provided with a resilient element arranged to resist movement of the first casing portion with respect to the second casing portion once installed into the turbomachine casing assembly, and wherein
the first casing portion is further provided with a release mechanism configured to release a pre-stress in the resilient element such that the resilient element is releasable from a pre-installation compressed position to an installed position.

15. A method of installing a first casing portion into a turbomachine casing assembly, the method comprising:
installing the first casing portion of claim 14 into the turbomachine casing assembly; and
releasing the release mechanism such that the resilient element is released from the pre-installation compressed position to the installed position.

* * * * *